United States Patent
Feng et al.

(10) Patent No.: US 11,626,256 B2
(45) Date of Patent: Apr. 11, 2023

(54) THERMO-ELECTRIC CAPACITOR

(71) Applicant: VERSITECH LIMITED, Hong Kong (CN)

(72) Inventors: Shien Ping Feng, Hong Kong (CN); Xun Wang, Hong Kong (CN); Yu Ting Huang, Hong Kong (CN); Zeyang Zheng, Hong Kong (CN); Lei Wang, Hong Kong (CN); Ka Ho Li, Hong Kong (CN); Kaiyu Mu, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 262 days.

(21) Appl. No.: 16/957,959

(22) PCT Filed: Jan. 15, 2019

(86) PCT No.: PCT/CN2019/071777
§ 371 (c)(1),
(2) Date: Jun. 25, 2020

(87) PCT Pub. No.: WO2019/137556
PCT Pub. Date: Jul. 18, 2019

(65) Prior Publication Data
US 2021/0366659 A1  Nov. 25, 2021

Related U.S. Application Data

(60) Provisional application No. 62/617,514, filed on Jan. 15, 2018.

(51) Int. Cl.
*H01G 9/042* (2006.01)
*H01G 9/028* (2006.01)
(Continued)

(52) U.S. Cl.
CPC ............. *H01G 9/042* (2013.01); *H01G 9/028* (2013.01); *H01G 9/21* (2013.01); *H01M 4/583* (2013.01); *H01M 4/602* (2013.01)

(58) Field of Classification Search
CPC .......... H01G 9/042; H01G 9/028; H01G 9/21; H01M 4/583; H01M 4/602; H01M 14/00
See application file for complete search history.

(56) References Cited

U.S. PATENT DOCUMENTS

2014/0252531 A1  9/2014  Aryan et al.
2015/0099150 A1  4/2015  Lee et al.
(Continued)

FOREIGN PATENT DOCUMENTS

CN  106935862 A  7/2017

OTHER PUBLICATIONS

Chu, S. et al., "Opportunities and challenges for a sustainable energy future", Nature, Aug. 16, 2012, 488:294-303, Macmillan Publishers Limited.
(Continued)

*Primary Examiner* — Stewart A Fraser
(74) *Attorney, Agent, or Firm* — Saliwanchik, Lloyd & Eisenschenk (57) ABSTRACT

Devices that convert heat into electricity, and methods for a fabrication of the same are provided. The asymmetric thermo-electrochemical capacitor uses a GO-based positive electrode and a battery-type negative electrode to open up the operating voltage window and enhance the electrical discharge capacity for converting low-grade heat into electricity with excellent efficiency, fast thermo-charging time, and stable cycles. The thermo-electrochemical device includes a carbon-based positive electrode, a conductive polymer or a metal-organic framework as negative electrode, a current collector, and a porous separator.

7 Claims, 5 Drawing Sheets

(51) Int. Cl.
*H01G 9/21* (2006.01)
*H01M 4/583* (2010.01)
*H01M 4/60* (2006.01)

(56) References Cited

U.S. PATENT DOCUMENTS

2015/0311569 A1* 10/2015 Yu .................. H01M 4/131
429/315
2020/0295370 A1* 9/2020 Yu .................. H01G 11/02

OTHER PUBLICATIONS

Rattner, A.S. et al., "Energy harvesting, reuse and upgrade to reduce primary energy usage in the USA", Energy, 2011, 36:6172-6183, Elsevier Ltd.
Bell, L.E., "Cooling, Heating, Generating Power, and Recovering Waste Heat with Thermoelectric Systems", Science, Sep. 12, 2008, 321:1457-1461.
Vining, C.B., "An inconvenient truth about thermoelectrics", Nature Materials, Feb. 2009, 8:83-85.
Rosi, F.D., "Thermoelectricity and Thermoelectric Power Generation", Solid-State Electronics, Pergamon Press, 1968, 11:833-868.
Disalvo, F.J., "Thermoelectric Cooling and Power Generation", Science, Jul. 30, 1999, 285:703-706.
Poudel, B. et al., "High-Thermoelectric Performance of Nanostructured Bismuth Antimony Telluride Bulk Alloys", Science, May 2, 2008, 320:634-638.
Kraemer, D. et al., "High-performance flat-panel solar thermoelectric generators with high thermal concentration", Nature Materials, Jul. 2011, 10:532-538, Macmillan Publishers Limited.
Zebarjadi, M. et al., "Perspectives on thermoelectrics: from fundamentals to device applications", Energy & Environmental Science, 2012, 5:5147-5162, The Royal Society of Chemistry.
Feng, S.P. et al., "Reliable contact fabrication on nanostructured $Bi_2Te_3$-based thermoelectric materials", Phys. Chem. Chem. Phys., 2013, 15:6757-6762, the Owner Societies.
Kim, H.S. et al., "Relationship between thermoelectric figure of merit and energy conversion efficiency", PNAS, Jul. 7, 2015, 112(27):8205-8210.
Quickenden, T.I. et al., "A Review of Power Generation in Aqueous Thermogalvanic Cells", J. Electrochem. Soc., Nov. 1995, 142(11):3985-3994, The Electrochemical Society, Inc.
Hu, R. et al., "Harvesting Waste Thermal Energy Using a Carbon-Nanotube-Based Thermo-Electrochemical Cell", Nano Letters, 2010, vol. 838, 9 pages, American Chemical Society.
Zhang, L. et al., "High Power Density Electrochemical Thermocells for Inexpensively Harvesting Low-Grade Thermal Energy", Advanced Materials, 2017, 29(1605652):1-7, WILEY-VCH Verlag GmbH & Co. KGaA, Weinheim.
Abraham, T.J. et al., "High Seebeck coefficient redox ionic liquid electrolytes for thermal energy harvesting", Energy & Environmental Science, 2013, 6:2639-2645, The Royal Society of Chemistry.

Salazar, P.F. et al., "Nitrogen- and Boron-Doped Carbon Nanotube Electrodes in a Thermo-Electrochemical Cell", Journal of The Electrochemical Society, 2012, 159(5):B483-B488, The Electrochemical Society.
Gur, I. et al., "Searching for a Better Thermal Battery", Science, Mar. 23, 2012, 335:1454-1455, AAAS.
Lee, S.W. et al., "An electrochemical system for efficiently harvesting low-grade heat energy", Nature Communications, 2014, pp. 1-7, Macmillan Publishers Limited.
Yang, Y. et al., "Membrane-Free Battery for Harvesting Low-Grade Thermal Energy", Nano Letters, 2014, 14:6578-6583, American Chemical Society.
Yang, Y. et al., "Charging-free electrochemical system for harvesting low-grade thermal energy", PANS, Dec. 2, 2014, 111(48):17011-17016.
Härtel, A. et al., "Heat-to-current conversion of low-grade heat from a thermocapacitive cycle by supercapacitors", Energy & Environmental Science, 2015, 8:2396-2401, The Royal Society of Chemistry.
Zhai, P. et al., "Water-soluble Microwave-exfoliated Graphene Nanosheet/Platinum Nanoparticle Composite and Its Application in Dye-Sensitized Solar Cells", Electrochimica Acta, 2014, 132:186-192, Elsevier Ltd.
Zhai, P. et al., "High Electrocatalytic and Wettable Nitrogen-Doped Microwave-Exfoliated Graphene Nanosheets as Counter Electrode for Dye-Sensitive Solar Cells", Small, 2014, 10(16):3347-3353, Wiley-VCH Verlag GmbH & Co. KGaA, Weinheim.
Zhai, P. et al., "Tuning Surface Wettability and Adhesivity of a Nitrogen-Doped Graphene Foam after Water Vapor Treatment for Efficient Oil Removal", Advanced Materials Interfaces, 2015, 2(1500243):1-8, WILEY-VCH Verlag GmbH & Co. KGaA, Weinheim.
Zhai, P. et al., "A Significant Improvement in the Electrocatalytic Stability of N-Doped Graphene Nanosheets Used as a Counter Electrode for $[Co(bpy)_3]3^{+/230}$ Based Porphyrin-Sensitized Solar Cells", ACS Applied Materials & Interfaces, 2015, 7:2116-2123, American Chemical Society.
Zhai, P. et al., "Electric-Field-Tunable Conductivity in Graphene/Water and Graphene/Ice Systems", Advanced Science News, Small, 2017, 13(1701149):1-8, Wiley-VCH Verlag GmbH & Co. KGaA, Weinheim.
Zhu, Y. et al., "Carbon-Based Supercapacitors Produced by Activation of Graphene", Science, Jun. 24, 2011, 332:1537-1541, American Association for the Advancement of Science.
Wessells, C.D. et al., "Nickel Hexacyanoferrate Nanoparticle Electrodes For Aqueous Sodium and Potassium Ion Batteries", Nano Letters, 2011, 11:5421-5425, American Chemical Society.
Forster, R.J. et al., "Electrochemistry of Spontaneously Adsorbed Monolayers. Effects of Solvent, Potential, and Temperature on Electron Transfer Dynamics", J. Am. Chem. Soc., 1994, 116:5453-5461, American Chemical Society.
Al-Degs, Y.S. et al., "Effect of solution pH, ionic strength, and temperature on adsorption behavior of reactive dyes on activated carbon", Dyes and Pigments, 2008, 77:16-23, Elsevier Ltd.
International Search Report dated Apr. 17, 2019 in International Application No. PCT/CN2019/071777.
International Preliminary Report on Patentability dated Apr. 29, 2020 in International Application No. PCT/CN2019/071777.

* cited by examiner

THERMO-ELECTRIC CAPACITOR

CROSS-REFERENCE TO RELATED APPLICATIONS

This application is the U.S. national stage application of International Patent Application No. PCT/CN2019/071777, filed Jan. 15, 2019, which claims the benefit of U.S. Provisional Application No. 62/617,514, filed Jan. 15, 2018, the disclosure of each of which is incorporated herein by reference in its entirety.

FIELD OF INVENTION

Embodiments of the subject invention relate to a thermo-electrochemical capacitor (TEC) that converts heat into electricity and combines low grade heat conversion with charge storage.

BACKGROUND

Low-grade heat (<100° C.) is projected to be one of the most sustainable energy sources due to its abundant availability in the environment (e.g., solar-thermal, geo-thermal energy) and in the form of waste heat from industrial processes. At least one-third of all energy consumption in the world ends up as low-grade heat. In 2004, the U.S. Department of Energy released a study, "Industrial Loss Reduction and Recovery in Industrial settings" that found that almost 2 quadrillion BTUs of energy could be recovered from waste heat. According to the DOE, the recovery of waste heat presents a savings opportunity for industry of approximately $6 billion/year.

Ubiquitous low-grade heat energy (<100° C.) is usually wasted without use, rather than being converted into usable electricity. Conversion is however still a great challenge because converting low-grade heat to electricity is inefficient due to the low temperature differential and the distributed nature of the heat sources. The performance and cost of currently available heat-to-electricity converters operating in a low-grade heat regime do not merit widespread adoption. A popular choice for heat to electricity conversion are thermoelectric (TE) semiconductor materials (e.g., $Bi_2Te_3$), which work via temperature differentials, however their conversion efficiency is less than 2% when operating in a low-grade heat regime. Electrochemical systems have received increasing attention, as the Seebeck coefficient of >1 mV/K is one order of magnitude higher than that of TE materials (100-200 μV/K). Thermo-electrochemical cells (TECs) are usually low in cost because they use readily available materials, without the need for expensive fabrication processes. Similar to a TE generator, TECs can operate under a temperature difference to convert heat into electricity based on the temperature-dependent redox potential between the hot and cold sides. However, their efficiency is only 0.2%~0.3% due to the poor ionic conductivity of the electrolyte. An alternative TEC approach is to explore the thermal cycle based on the temperature-dependent redox potential in a battery system or the temperature-dependent electrostatic potential in an electrochemical capacitor system, where the connection to the hot or cold reservoir alternates in a cycle to convert heat into electricity. A TEC based on the thermal cycle reaches a good efficiency of approximately 3% when cycling in a low-grade heat regime, but doing so requires external electricity at the start to force-charge the electrodes in each cycle, which complicates the system design and limits practical applications.

A "thermal charging" phenomenon in an electrochemical system provides a cost-effective route for the conversion of heat to electricity via a heating operation instead of using a thermal gradient or thermal cycle (note: a certain amount of energy has to be used to maintain a good temperature difference, which usually does not count in the calculation of the overall energy conversion efficiency).

BRIEF SUMMARY

An asymmetric TEC using a graphene oxide (GO)-based positive electrode and a battery-type negative electrode can achieve a TEC conversion efficiency of over 3%, which is higher than that of a TE generator in a low temperature regime. The conductive polymer of polyaniline (PANT) and metal-organic framework (MOF) of nickel hexacyanoferrate (NiHCF) can be used as active materials for the battery-type negative electrode. This system can achieve a high electrochemical Seebeck coefficient of 3-4.4 mV/K and a thermal voltage of 200-350 mV when heated at 70° C. The electricity generated at a high temperature can be stored in the device (e.g., commercial supercapacitor) after its temperature is lowered to room temperature. Further optimization with a high electrochemical Seebeck coefficient, fast kinetics, and a low heat capacity can lead to a commercial product that combines low-grade heat conversion and charge storage.

Embodiments of the subject invention provide an asymmetric TEC using a GO-based positive electrode and a battery-type negative electrode to open up the operating voltage window and enhance the electrical discharge capacity for converting low-grade heat into electricity with excellent efficiency, fast thermo-charging time, and stable cycles. The conductive polymer of polyaniline (PANT) and a metal-organic framework (MOF) of nickel hexacyanoferrate (NiHCF) can be used as active materials for the negative electrode. The work function and surface wettability of GO-based positive electrodes can be tuned to further increase the thermal voltage and shorten the thermal charging time. Experiment results confirm that the TEC conversion efficiency is higher than that of a TE generator in a low temperature regime.

DETAILED DESCRIPTION

Low grade heat is abundantly available in industrial processes, environment, biological entities, solar-thermal, and geothermal energy. Embodiments of the subject invention provide devices and methods to efficiently convert this low-grade heat (<100° C.) into electricity. Currently available heat-to-current converters, such as thermoelectric generators, operating in a low-grade heat regime reach efficiencies no higher than a few percent. The TEC combines low-grade heat conversion and charge storage. The TEC converts thermal energy to electrical energy and provides a new sustainable method of generating and storing energy from solar and waste heat.

Embodiments of the subject invention provide a thermo-electrochemical device (TEC) that converts heat into electricity and is comprised of: (a) a carbon-based (e.g., graphene oxide (GO)) positive electrode; (b) a conductive polymer (e.g., polyaniline (PANT)) or a metal-organic framework (MOF) (e.g., Prussian blue (PB) analogue such as NiHCF and CuHCF) negative electrode, (c) a current collector, and (d) a porous separator.

A method of preparing a positive electrode includes mixing graphene oxide (GO), carbon black and polyvinylidene difluoride (PVDF) with N-Methyl-2-pyrrolidone (NMP) into a paste and then coating the paste onto a carbon cloth. The mass ratio of GO, carbon black, and PVDF can be 75:15:10, and the total solid content in NMP can be approximately 25 mg/mL.

A method of preparing a PANT negative electrode can include mixing 75 wt % PANT powder (emeraldine base), 15 wt % carbon black, and 10 wt % PVDF in NMP, which can then be coated onto a titanium form (TF) or a carbon cloth (CC) by drop casting.

A method for preparing a NiHCF electrode can include mixing 70 wt % NiHCF nanoparticles, 20 wt % carbon black, and 10 wt % PVDF in NMP, and then coating the substance onto a titanium form or a carbon cloth by drop casting.

The TEC device can perform a heat-to-current conversion while operating at an isothermal condition without using thermal gradient or thermal cycle. An isothermal operation enables effective heat recuperation (50-70%) to boost the overall efficiency of the device. The device can operate at an isothermal condition within a temperature range of from 0° C. to 200° C.

Embodiments of the subject invention convert heat to electricity, which is more efficient and cost-effective in a low-grade heat regime as compared to the current available technology, such as a solid-state thermoelectric generator. Certain embodiments of the subject invention are applicable to the development of a rechargeable device which can directly store the electrical energy generated by heating.

The subject invention includes, but is not limited to, the following exemplified embodiments.

Embodiment 1. A thermo-electrochemical device that converts heat into electricity, comprising:
 a carbon-based positive electrode;
 a conductive polymer or a metal-organic framework (MOF) as a negative electrode;
 a current collector; and
 a porous separator.

Embodiment 2. The thermo-electrochemical device of embodiment 1, wherein the carbon-based positive electrode is comprised of graphene oxide (GO).

Embodiment 3. The thermo-electrochemical device according to any of embodiments 1-2, wherein the conductive polymer is polyaniline (PANI).

Embodiment 4. The thermo-electrochemical device according to any of embodiments 1-3, wherein the metal-organic framework is a Prussian blue analogue such as NiHCF or CuHCF.

Embodiment 5. The thermo-electrochemical device according to any of embodiments 1-4, wherein the device operates at an isothermal condition during a heat-to-current conversion cycle.

Embodiment 6. The thermo-electrochemical device of embodiment 5, wherein the device operates within a temperature range of from 0° C. to 200° C.

Embodiment 7. A method for fabricating a thermo-electrochemical device, the method comprising:
 preparing a graphene oxide positive electrode by mixing GO, carbon black, polyvinylidene difluoride, and N-Methyl-2-pyrrolidone (NMP) into a paste; and coating the paste on a carbon cloth.

Embodiment 8. The method of embodiment 7, wherein the mass ratio of graphene oxide, carbon black, and PVDF is 75:15:10; and the total solid content of NMP is 25 mg/mL.

Embodiment 9. The thermo-electrochemical device according to any of embodiments 1-8, further comprising:
 preparing a PANI negative electrode by mixing 75 wt % PANI powder with an emeraldine base, 15 wt % carbon black, and 10 wt % PVDF in N-Methyl-2-pyrrolidone, and coating the PANT mixed substance onto a titanium form or a carbon cloth.

Embodiment 10. The method of embodiment 9, wherein the PANT mixed substance is coated onto the titanium form or carbon cloth by drop casting.

Embodiment 11. The thermo-electrochemical device according to any of embodiments 1-8, further comprising:
 preparing a NiHCF negative electrode by mixing 70 wt % NiHCF nanoparticles, 20 wt % carbon black, and 10 wt % PVDF in NMP, and coating the NiHCF mixed substance onto a titanium form or carbon cloth.

Embodiment 12. The method of embodiment 11, wherein the NiHCF mixed substance is coated onto the titanium form or carbon cloth by drop casting.

Embodiment 13. The potential applications of the thermo-electrochemical (TEC) device.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 1:
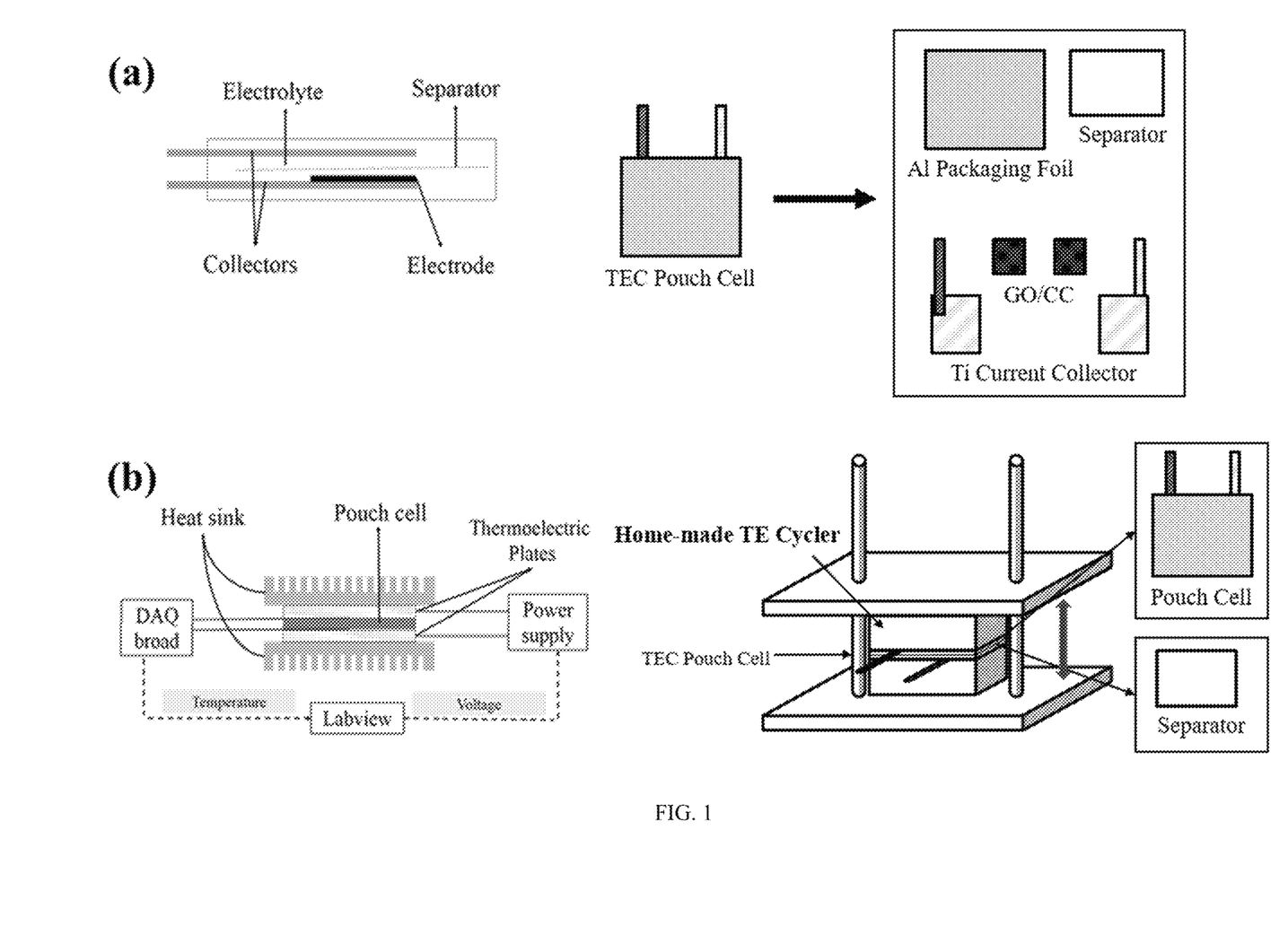
FIG. 1(a) shows a diagram and image of a photograph of a two-electrode TEC pouch cell configuration.
FIG. 1(b) shows a diagram and image of a TE temperature cycler.

To facilitate rapid and uniform heating, a two-electrode or three-electrode TEC pouch cell configuration was used in the preliminary experiment, as shown in FIG. 1(a). Three-electrode pouch cells were used to measure the potential of each electrode independently with respect to the reference Ag/AgCl electrode located between separators. The reference Ag/AgCl electrode was fabricated by oxidizing Ag foil in 1M NaCl under a constant current of 1 mA/cm$^2$ for 40 min. Two-electrode pouch cells were used to measure the full-cell thermal voltage, electrical discharge capacity, and energy conversion efficiency ($\eta_E$). The positive electrode, porous separator, and negative electrode were sandwiched with 500 μL 1M KCl electrolyte (pH=7, 102 mS/cm). Aqueous KCl was used as the electrolyte because it is neutral, environmentally robust, easy to handle in ambient condition, and has an almost two-fold conductivity compared to organic electrolytes (e.g., 1M TEABF$_4$ in ACN). A Ti foil was used as the current collector because it is stable and does not corrode in a KCl solution. The typical thickness of the cell was 1 to 1.5 mm. A homemade thermoelectric-based temperature cycler was used to control the heating and cooling using the Labview program (see, for example, FIG. 1(b)). Thermopaste (Omega) was applied to all of the interfaces to ensure good thermal contact. The electrochemical measurements (e.g., OCP, electrical discharge capacity) were performed in Gamry Reference 3000 Potentiostat. All pouch cells were tested after 12 hours of a short-circuit equilibrium process.

Example 2-GO Positive Electrode

Graphene oxide (GO), synthesized from natural graphite flakes via modified Hummer's method, was chosen as the active material because it has more and stronger carboxyl and carbonyl functional groups (e.g., —COOH, —C=O) on the surface. GO, carbon black, and polyvinylidene difluoride (PVDF) were mixed with N-Methyl-2-pyrrolidone (NMP) into a paste and then coated on a carbon cloth (CC). The mass ratio of GO, carbon black, and PVDF was 75:15:10, and the total solid content in NMP was around 25 mg/mL. After drying for 3 hours at 70° C., the mass loading of the GO was 3 mg/cm$^2$.

Example 3-PANI or NiHCF Negative Electrode

The conductive polymer of PANT and MOF of NiHCF were used as active materials for the negative electrode, respectively. The PANT electrode was prepared by mixing 75 wt % PANT powders (emeraldine base), 15 wt % carbon black, and 10 wt % PVDF in NMP, which was then coated on Ti form (TF) or CC by drop casting. The mass loading of PANT was about 1 mg/cm$^2$. Besides PANI, NiHCF was used as the active material for the negative electrode. NiHCF is a Prussian Blue (PB) analogue with the chemical formula KNiFe(CN)$_6$.nH$_2$O, which consist of large interstitial sites within an open framework that can host solvated alkali ions (e.g., K$^+$ or Na$^+$) and/or zeolitic water. This structure can allow rapid ion transport throughout its lattice during electrical charge/discharge processes. NiHCF nanoparticles were synthesized using a simple solution approach by dropping 50 mM Ni(NO$_3$)$_2$ solution into 25 mM K$_3$Fe(CN)$_6$ solution at 50° C. The NiHCF electrode was prepared by mixing 70 wt % NiHCF nanoparticles, 20 wt % carbon black, and 10 wt % PVDF in NMP, which was then coated on a titanium form or carbon cloth by drop casting. The mass loading of the NiHCF was about 1 mg/cm$^2$.

Example 4-Heat-to-Electricity Conversion Efficiency

Figure 2:
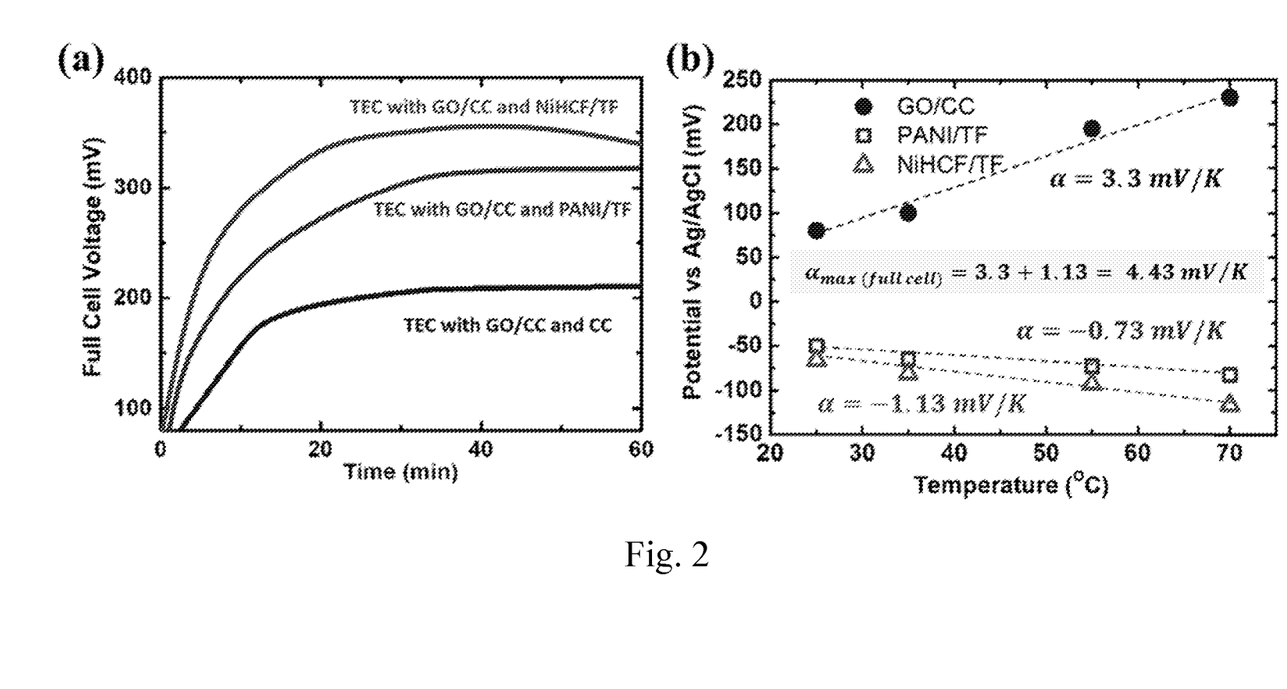
FIG. 2(a) shows a plot of the OCP measured at 70° C. for TEC with GO/CC and CC, TEC with GO/CC and PANT/TF, and TEC with GO/CC and NiHCF/TF.
FIG. 2(b) shows a plot of the OCP (vs. Ag/AgCl) of GO/CC, PANT/TF and NiHCF/TF measured at various temperatures.

The TEC cell was assembled with GO positive electrode and PANI or NiHCF negative electrode with 500 µL of 1M KCl electrolyte. A full cell voltage up to 350 mV was generated in 30 min when the TEC with GO/CC and NiHCF/TF electrodes were heated at 70° C. (see, for example, FIG. 2), indicating a high electrochemical Seebeck coefficient of 4.4 mV/K (Note: this will be a record-high value in an electrochemical system). It is noted that the voltage could be generated slowly even at room temperature, indicating that the thermal charging process was similar to a pseudocapacitive behavior, in which the surface adsorption/desorption rate was enhanced with increasing temperature. The thermal voltage was sustained over several cycles, where the two-electrode pouch cell was thermally charged at 70° C. for 30 min and then electrically discharged at a constant current of 1 mA to 0 V.

Figure 3:
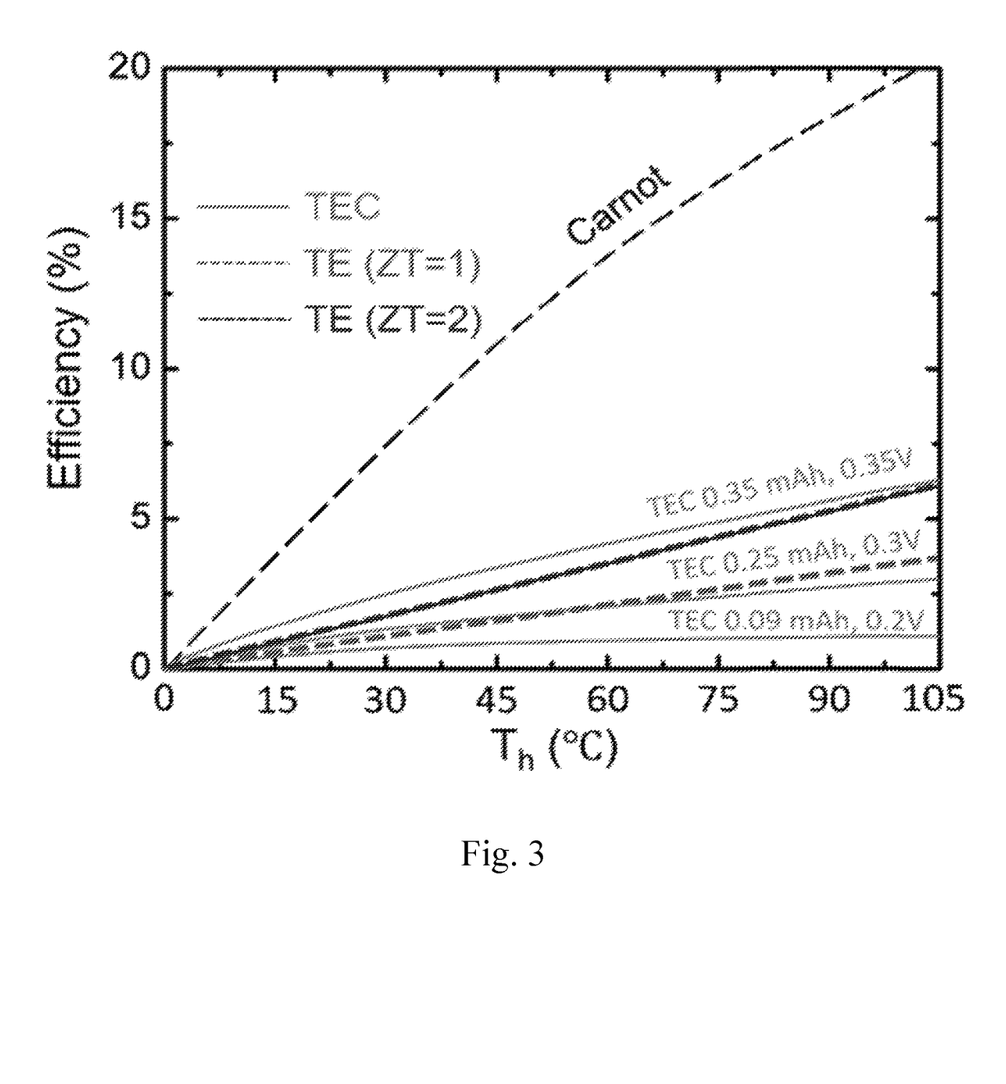
FIG. 3 shows a plot of the theoretical efficiency of TEC and TE.

The $\eta_E$ of the proposed thermally chargeable TEC can be calculated as the electrical energy discharge after one thermal charging process divided by the amount of thermal energy needed to heat up the device, which can be expressed as:

$$\eta_E = \frac{QV - E_{loss}}{2mC_p\Delta T(1-\eta_{HR})}, \quad (1)$$

where Q is the discharge capacity (coulomb or mAh), V is voltage (V), m is the total mass, $C_p$ is the average specific heat of TEC, $\Delta T$ is the temperature difference between the heat source and room temperature (e.g., $\Delta T$=70−25=45° C.), $E_{loss}$ is the energy loss and $\eta_{HR}$ is the heat recuperation efficiency. According to the specific heat of materials, the average specific heat of the two-electrode TEC was estimated to be around 0.72 J g$^{-1}$ K$^{-1}$ assuming the mass ratio of the current collector, electrode material, electrolyte and separator was roughly 65%:15%:0.25%:19.75%. The total mass of TEC used was 0.255 grams including all materials except the Al packaging foil. The calculation shows that $\eta_E$ can exceed 3% at 70° C. ($\Delta T$=45° C.) when achieving a thermal voltage of 350 mV and discharge capacity of 0.3 mAh (see, for example, FIG. 3), which is comparable to TE with ZT≈2 in a similar low temperature regime (~20% Carnot efficiency). Because an $\eta_{HR}$ of 50%-70% can be readily reached in a heating operation, the overall $\eta_E$ could be further boosted up to 6% if a heat exchanger with $\eta_{HR}$ of 50% is used.

Figure 4:
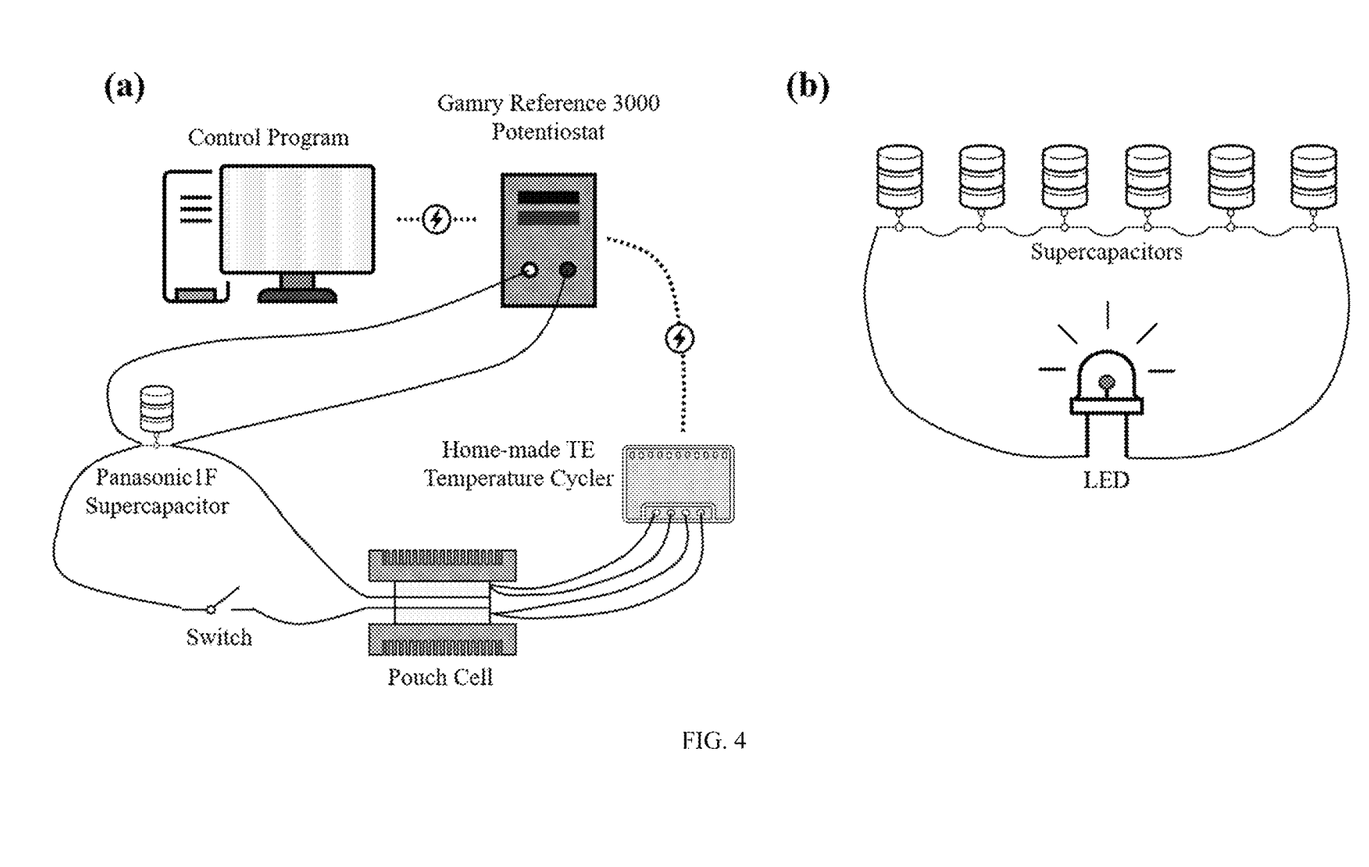
FIG. 4(a) shows an image of a demonstration set up for using TEC to charge into a commercial Panasonic 1F supercapacitor.
FIG. 4(b) shows an image of an LED lighting up by connecting the charged supercapacitors in series.

FIG. 4(a) shows a demonstration of using the TEC to convert heat into electricity and then charge into a commercial Panasonic 1F supercapacitor, and lighting up the LEDs by connecting the charged supercapacitors in series, as seen in FIG. 4(b). The system achieves a high conversion efficiency of 3%, which can be raised to ~4.76% under 50% heat recuperation.

Example 5—TEC Prototype Products Design and its Applications

Figure 5A:
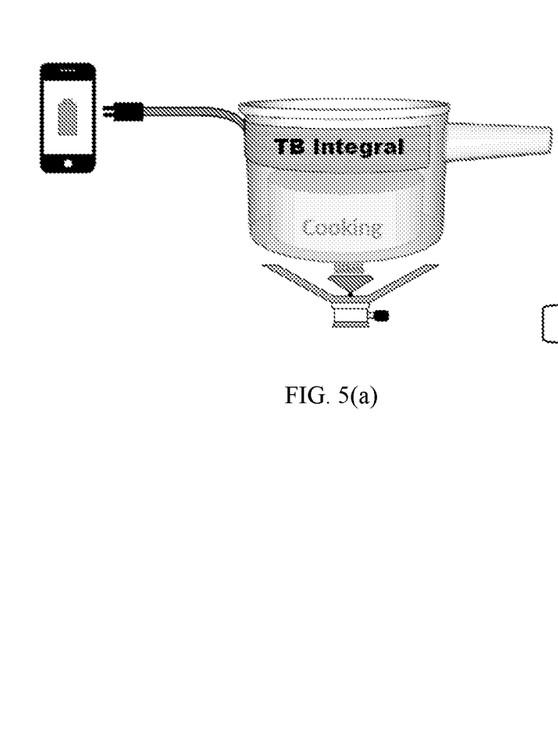
FIG. 5(a) shows a TEC prototype product design of a cooking pot charger.
Figure 5B:
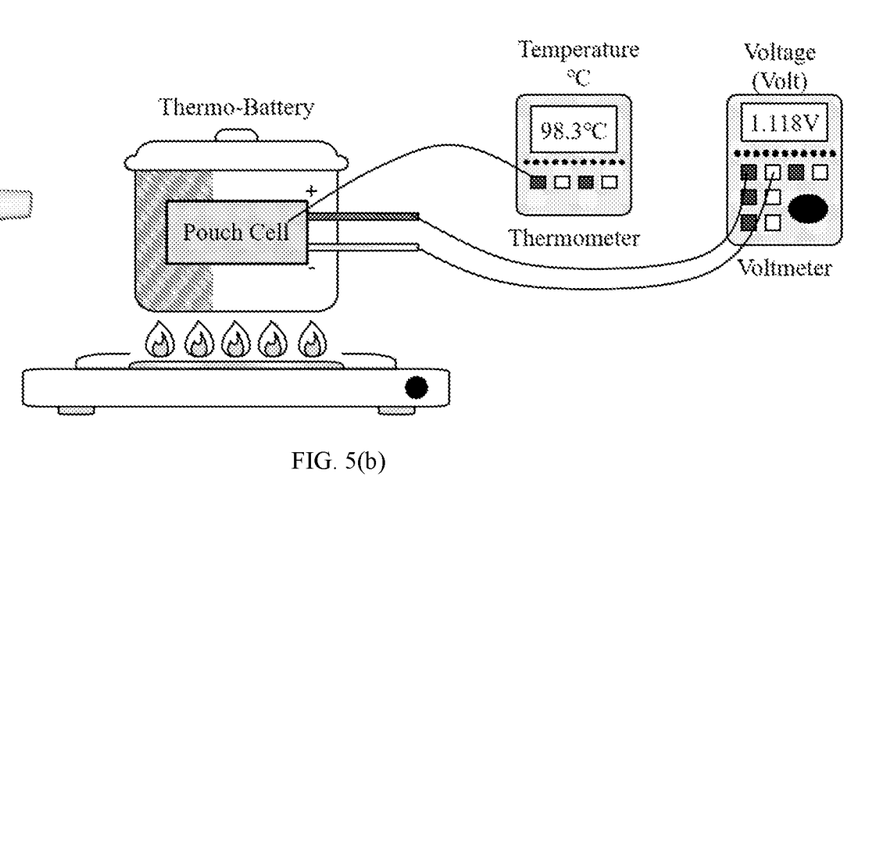
FIG. 5(b) shows a demonstration of a TEC product set up for generating a thermo-voltage of 1.1 V.

For large-scale production, a focus is on the development of materials, a TEC system, product design, and a thermal/electrical management system. The size of electrodes and cell assembly can be improved to satisfy the requirements of a larger sized TEC module. FIG. 5 presents a prototype design of a TEC module used as a cooking pot charger, which can achieve a thermal voltage of >1 V when the temperature reaches >90° C. The TEC module can be connected in series and parallel in order to realize a higher voltage and power output.

Example 6—TEC as Power Source of Wearable Devices

The TEC cell of the subject invention can be used as a primary or auxiliary power source for wearable electronics and medical devices such as hearing aid, watches, activity tracker, sensors, wireless transmitters, eye-glasses, blood pressure monitors, thermometers, sleep trackers, UV sensors, smart clothing, etc. by harvesting energy from the ambient environment and the body heat of the users. The TEC cell can also be attached to different kinds of commercial and household solar panels to increase the power conversion efficiency of the solar panels.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] S. Chu, A. Majumdar, *Opportunities and challenges for a sustainable energy future*, Nature 488, 294 (2012).
[2] A. S. Rattner, S. Garimella, *Energy harvesting, reuse and upgrade to reduce primary energy usage in the USA*, Energy 36, 6172 (2011).
[3] L. E. Bell, *Cooling, Heating, generating power, and recovering waste heat with thermoelectric systems*, Science 321, 1457 (2008).
[4] C. B. Vining, *An inconvenient truth about thermoelectrics*, Nature Materials 8, 83 (2009).
[5] F. D. Rosi, *Thermoelectricity and thermoelectric power generation*, Solid-State Electronics 11, 833 (1968).
[6] F. J. DiSalvo, *Thermoelectric cooling and power generation*, Science 285, 703 (1999).
[7] B. Poudel, Q. Hao, Y. Ma, Y. C. Lan, A. Minnich, B. Yu, X. Yan, D. Wang, A. Muto, D. Vashaee, X. Y. Chen, J. Liu, M. S. Dresselhaus, G. Chen, Z. F. Ren, *High thermoelectric performance of nanostructured bismuth antimony telluride bulk alloys*, Science 320, 634 (2008).
[8] D. Kraemer, B. Poudel, S. P. Feng, J. C. Caylor, B. Yu, X. Yan, Y. Ma, X. Wang, D. Wang, A. Muto, K. McEnaney, M. Chiesa, Z. F. Ren, G. Chen, *High-performance flat-panel solar thermoelectric generators with high thermo concentration*, Nature Materials 10, 532 (2011).
[9] M. Zebarjadi, K. Esfarjani, M. S. Dresselhaus, Z. F. Ren, G. Chen, *Perspectives on thermoelectrics: from fundamentals to device applications*, Energy & Environmental Science 5, 5147 (2012).
[10] S. P. Feng, Y. H. Chang, J. Yang, B. Poudel, B. Yu, Z. F. Ren, G. Chen, *Reliable contact fabrication on nanostructured $Bi_2Te_3$-based thermoelectric materials*, Physical Chemistry Chemical Physics 15, 6757 (2013).
[11] H. S. Kim, W. Liu, G. Chen, C. W. Chu, Z. F. Ren, *Relationship between thermoelectric figure of merit and energy conversion efficiency*, Proceedings of the National Academy of Sciences 112, 8205 (2015).
[12] T. I. Quickenden, Y. Mua, *A review of power generation in aqueous thermogalvanic cells*, Journal of The Electrochemical Society 142, 3985 (1995).
[13] R. Hu, B. A. Cola, N. Haram, J. N. Barisci, S. Lee, S. Stoughton, G. Wallace, C. Too, M. Thomas, A. Gestos, M. E. Cruz, J. P. Ferraris, A. A. Zakhidov, R. H. Baughman, *Harvesting waste thermo energy using a carbon-nanotube-based thermo-electrochemical cell*, Nano Letters 10, 838 (2010).
[14] L. Zhang, T. Kim, N. Li, T. J. Kang, J. Chen, J. M. Pringle, M. Zhang, A. H. Kazim, S. Fang, C. Haines, D. Al-Masri, B. A. Cola, J. M. Razal, J. Di, S. Beirne, D. R. MacFarlane, A. Gonzalez-Martin, S. Mathew, Y. H. Kim, G. Wallace, R. H. Baughman, *High power density electrochemical thermocells for inexpensively harvesting low-grade thermo energy*, Advanced Materials 29, 1605652 (2017).
[15] T. J. Abraham, D. R. MacFarlanea, J. M. Pringleb, *High Seebeck coefficient redox ionic liquid electrolytes for thermo energy harvesting*, Energy & Environmental Science 6, 2639 (2013).
[16] P. F. Salazar, S. Kumar, B. A. Cola, *Nitrogen- and Boron-Doped Carbon Nanotube Electrodes in a Thermo-Electrochemical Cell*, Journal of The Electrochemical Society 159, B483 (2012).
[17] I. Gur, K. Sawyer, R. Prasher, *Searching for a Better Thermo Battery*, Science 335, 1454 (2012).
[18] S. W. Lee, Y. Yang, H. W. Lee, H. Ghasemi, D. Kraemer, G. Chen, Y. Cui, *An electrochemical system for efficiently harvesting low-grade heat energy*, Nature Communications 5, 3942 (2014).
[19] Y. Yang, J. Loomis, H. Ghasemi, S. W. Lee, Y. J. Wang, Y. Cui, G. Chen, *Membrane-free battery for harvesting low-grade thermo energy*, Nano Letters 14, 6578 (2014).
[20] Y. Yang, S. W. Lee, H. Ghasemi, J. Loomis, X. Li, D. Kraemer, G. Zheng, Y. Cui, G. Chen, *Charging-free electrochemical system for harvesting low-grade thermo energy*, Proceedings of the National Academy of Sciences 111, 17011 (2014).
[21] A. Härtel, D. Weingarth, V. Presser, R. van Roij, *Heat-to-current conversion of low-grade heat from a thermocapacitive cycle by supercapacitors*, Energy & Environmental Science 8, 2396 (2015).
[22] P. Zhai, Y. H. Chang, Y. T. Huang, T. C. Wei, H. Su, S. P. Feng, *Water-soluble microwave-exfoliated graphene nanosheet/platinum nanoparticle composite and its application in dye-sensitized solar cells*, Electrochimica Acta 132, 186 (2014).
[23] P. Zhai, T. C. Wei, Y. H. Chang, Y. T. Huang, W. T. Yeh, H. Su, S. P. Feng, *High electrocatalytic and wettable nitrogen-doped microwave-exfoliated graphene nanosheets as counter electrode for dye-sensitized solar cells*, Small 10, 3347 (2014).
[24] P. Zhai, H. Jia, Z. Zheng, C. C. Lee, H. Su, T. C. Wei, S. P. Feng, *Tuning surface wettability and adhesivity of nitrogen-doped graphene foam after water vapor treatment for efficient oil removal*, Advanced Materials Interfaces 2, 1500243 (2015).
[25] P. Zhai, C. C. Lee, Y. H. Chang, C. Liu, T. C. Wei, S. P. Feng, *A significant improvement in the electrocatalytic stability of N-doped graphene nanosheets used as a counter electrode for $[Co(bpy)_3]^{3+/2+}$ based porphyrin-sensitized solar cells*, ACS Applied Materials & Interfaces 7, 2116 (2015).
[26] P. Zhai, Y. Wang, C. Liu, X. Wang, S. P. Feng, *Electric-field-tunable conductivity in graphene/water and graphene/ice systems*, Small 13, 1701149 (2017).
[27] Y. Zhu, S. Murali, M. D. Stoller, K. J. Ganesh, W. Cai, P. J. Ferreira, A. Pirkle, R. M. Wallace, K. A. Cychosz, M. Thommes, D. Su, E. A. Stach, R. S. Ruoff, *Carbon-based supercapacitors produced by activation of graphene*, Science 332, 1537 (2011).
[28] C. D. Wessells, S. V. Peddada, R. A. Huggins, Y. Cui, *Nickel Hexacyanoferrate Nanoparticle Electrodes for Aqueous Sodium and Potassium Ion Batteries*, Nano Letters 11, 5421 (2011).
[29] B. E. Conway, E. Gileadi, M. Dzieciuch, *Calculation and analysis of adsorption pseudocapacitance and surface coverage from e.m.f. decay and polarization curves: Applications to a decarboxylation reaction*, Electrochim. Acta 8, 143 (1963).

[30] R. J. Forster, L. R. Faulkner, *Electrochemistry of spontaneously adsorbed monolayers. Effects of solvent, potential, and temperature on electron transfer dynamics*, Journal of the American Chemical Society 116, 5453 (1994).

[31] Y. S. Al-Degs, M. I. El-Barghouthi, A. H. El-Sheikh, G. M. Walker, *Effect of solution pH, ionic strength, and temperature on adsorption behavior of reactive dyes on activated carbon*, Dyes Pigments 77, 16 (2008).

What is claimed is:

1. A thermo-electrochemical device that converts heat into electricity, comprising:
   a carbon-based positive electrode;
   a conductive polymer or a metal-organic framework (MOF) as a negative electrode;
   a current collector; and
   a porous separator.

2. The thermo-electrochemical device of claim 1, wherein the carbon-based positive electrode is comprised of graphene oxide (GO).

3. The thermo-electrochemical device of claim 1, wherein the conductive polymer is polyaniline (PANI).

4. The thermo-electrochemical device of claim 1, wherein the metal-organic framework is a Prussian blue analogue.

5. The thermo-electrochemical device of claim 4, wherein the Prussian blue analogue is NiHCF or CuHCF.

6. The thermo-electrochemical device of claim 1, wherein the device operates at an isothermal condition during a heat-to-current conversion cycle.

7. The thermo-electrochemical device of claim 6, wherein the device operates within a temperature range of from 0° C. to 200° C.

* * * * *